(12) United States Patent
Kojima et al.

(10) Patent No.: US 8,099,950 B2
(45) Date of Patent: Jan. 24, 2012

(54) EXHAUST GAS PURIFYING APPARATUS FOR INTERNAL COMBUSTION ENGINE

(75) Inventors: Kazuo Kojima, Nagoya (JP); Takahiro Ono, Nagoya (JP)

(73) Assignee: DENSO Corporation, Kariya (JP)

(*) Notice: Subject to any disclaimer, the term of this patent is extended or adjusted under 35 U.S.C. 154(b) by 334 days.

(21) Appl. No.: 12/397,693

(22) Filed: Mar. 4, 2009

(65) Prior Publication Data

US 2009/0223208 A1    Sep. 10, 2009

(30) Foreign Application Priority Data

Mar. 5, 2008 (JP) ................................. 2008-055069

(51) Int. Cl.
*F01N 3/00* (2006.01)
(52) U.S. Cl. ............... 60/286; 60/274; 60/275; 60/285; 60/295; 60/296
(58) Field of Classification Search .................... 60/274, 60/275, 285, 295, 296
See application file for complete search history.

(56) References Cited

U.S. PATENT DOCUMENTS

| 2004/0045282 | A1* | 3/2004 | Ide et al. ......................... 60/285 |
| 2005/0252197 | A1* | 11/2005 | Nieuwstadt et al. ............ 60/277 |
| 2008/0282675 | A1* | 11/2008 | Stroia et al. ..................... 60/285 |

FOREIGN PATENT DOCUMENTS

JP          3788314         6/2006

* cited by examiner

*Primary Examiner* — Thomas Denion
*Assistant Examiner* — Michael Carton
(74) *Attorney, Agent, or Firm* — Nixon & Vanderhye P.C.

(57) ABSTRACT

The present invention provides, as one aspect, an exhaust gas purifying apparatus for an internal combustion engine including a setting unit that sets commanded values of an amount and a period of injection from an additive fuel injector, an adding controlling unit that injects fuel from the additive fuel injector in accordance with the commanded values, a determining unit that determines whether a high-accuracy measurement state has been entered in which a difference between measurement values of first and second air-to-fuel ratio sensors is within a predetermined range, and a calculating unit that calculates, when the high-accuracy measurement state has been entered, a deviation between the commanded value and a true value of the amount of injection by the adding controlling unit as a correction value, from at least one of the measurement values of the first and second air-to-fuel ratio sensors.

10 Claims, 5 Drawing Sheets

EXHAUST GAS PURIFYING APPARATUS FOR INTERNAL COMBUSTION ENGINE

CROSS REFERENCE TO RELATED APPLICATION

This application is based on and claims the benefit of priority from earlier Japanese Patent Application No. 2008-55069 filed Mar. 5, 2008, the description of which is incorporated herein by reference.

BACKGROUND OF THE INVENTION

1. Technical Field of the Invention

The present invention relates to an exhaust gas purifying apparatus for an internal combustion engine.

2. Related Art

In diesel engines and the like, a NOx occlusion-reduction catalyst (NOx catalyst, Lean NOx Trap [LNT]) may be disposed in an intermediate position in an exhaust pipe to remove nitrogen oxide (NOx) within the exhaust gas. In the LNT, the NOx is occluded in a normal, lean air/fuel mixture in the diesel engine. As a result of the mixture being periodically switched to a rich mixture, the occluded NOx is reduced to harmless nitrogen and discharged (which is referred to as "NOx reduction").

As a method of forming the rich mixture, a method referred to as exhaust fuel addition is known. In the method, an additive fuel injector is provided in an exhaust pipe. Fuel is injected from the additive fuel injector into the exhaust pipe, thereby providing unburned fuel serving as a reducing agent to the LNT. Furthermore, when the LNT is regenerated (SOx reduction) after being poisoned by sulfur within the fuel, the fuel may be injected from the additive fuel injector to form the rich mixture.

However, in the exhaust fuel addition method, a problem occurs in that, as the additive fuel injector is used, the actual injection amount (i.e. true value) becomes less than the commanded value of the injection amount because of clogging caused by soot and the like. Various proposals have been made to overcome this problem. For example, in Japanese Patent Publication No. 3788314, a technology is disclosed for correcting the injection amount depending on an extent of temperature increase, when temperature rises as a result of the fuel being added.

However, the method in Japanese Patent Publication No. 3788314 is disadvantageous in that calculation of a correction value is relatively time-consuming because of effects of heat capacity of the catalyst.

As a method of correcting the injection amount, a method is known in which an A/F (air-to-fuel ratio) sensor measures an A/F value when the additive fuel injector is used to form a rich state. The correction value is obtained from the measured A/F value. However, in this method, as a result of the rich state being formed, a large amount of unburned hydrocarbon (HC) having large molecular size is present in the exhaust gas. The unburned HC may not sufficiently burn, even with catalytic influence. In general, it is also known that the A/F sensor tends to incorrectly measure the A/F value when a large amount of unburned HC is present.

When the fuel is continuously injected from the additive fuel injector over a long duration, the unburned HC may pass through the catalyst, resulting in poor emission. Therefore, the fuel can be continuously injected from the additive fuel injector for about only one or two seconds. However, when the fuel is injected from the additive fuel injector for a short time, the A/F sensor, which is commonly slow to respond, cannot accurately measure the A/F value.

Moreover, when the fuel is injected from the additive fuel injector for a short time, a problem also occurs in that the fuel is deposited on the wall surface. In this phenomenon, the fuel injected from the additive fuel injector is deposited onto the wall surface of the exhaust pipe near the additive fuel injector. Because of the deposition of fuel onto the wall surface, the actual A/F value becomes greater than an A/F value expected from the injection amount. To suppress the effect of the deposition onto the wall surface, the amount of fuel deposited onto the wall surfaces and the amount of deposited fuel which evaporates are required to be balanced. To balance the amounts, the fuel is required to be continuously injected from the additive fuel injector. The above-described problems are present in the method of calculating the correction value of the injection amount through measurement of the A/F after the fuel is injected from the additive fuel injector.

SUMMARY OF THE INVENTION

In light of the above-described issues, an object of the present invention is to provide an exhaust gas purifying apparatus for an internal combustion engine which can accurately detect the amount of decrease in an actual value of the amount of fuel injected from a additive fuel injector with respect to a commanded value, which is caused by deterioration of the additive fuel injector, and calculate a correction value for the appropriate injection amount.

In order to achieve the object, the present invention provides, as one aspect, an exhaust gas purifying apparatus for an internal combustion engine comprising: an additive fuel injector that adds fuel into an exhaust passage, a catalyst providing an oxidation function, a first air-to-fuel ratio sensor that measures an air-to-fuel ratio, a NOx catalyst that occludes and reduces NOx, and a second air-to-fuel ratio sensor that measures an air-to-fuel ratio, which are arranged in the exhaust passage in sequence from an upstream side of the exhaust passage; a setting unit that sets commanded values of an amount and a period of injection from the additive fuel injector such that an air-to-fuel ratio within the exhaust passage is a target air-to-fuel ratio that is leaner than a theoretical air-to-fuel ratio; an adding controlling unit that injects fuel from the additive fuel injector for a predetermined period in accordance with the commanded values set by the setting unit; a determining unit that determines whether or not a high-accuracy measurement state has been entered in which a difference between a measurement value of the first air-to-fuel ratio sensor and a measurement value of the second air-to-fuel ratio sensor is within a predetermined range, during a period in which the air-to-fuel ratio within the exhaust passage is affected by the injection of fuel by the adding controlling unit; and a calculating unit that calculates, when the determining unit determines that the high-accuracy measurement state has been entered, a deviation between the commanded value and a true value of the amount of injection in the injection by the adding controlling unit as a correction value of the amount of injection, from at least one of the measurement value of the first air-to-fuel ratio sensor and the measurement value of the second air-to-fuel ratio sensor.

DETAILED DESCRIPTION OF THE PREFERRED EMBODIMENTS

Figure 1:
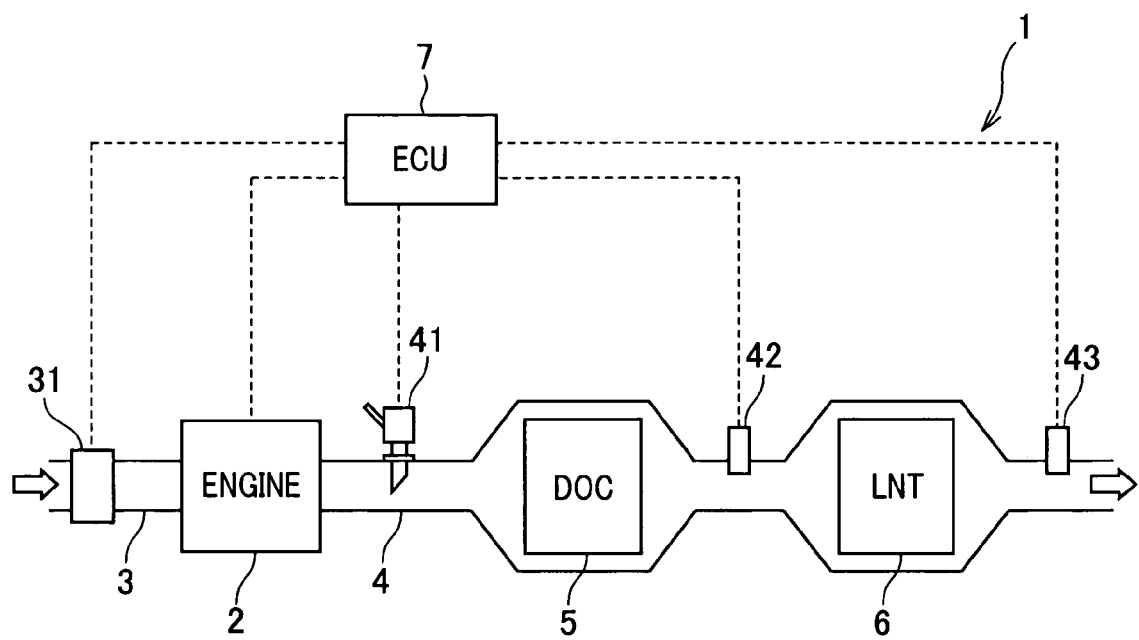
FIG. 1 is a schematic diagram of an exhaust gas purifying apparatus for an internal combustion engine according to an embodiment of the present invention.

Embodiments of the present invention will be described with reference to the accompanying drawings. FIG. 1 is a schematic diagram of a configuration of an exhaust gas purifying apparatus 1 for an internal combustion engine according to an embodiment of the present invention.

The internal combustion engine and the exhaust gas purifying apparatus 1 shown in FIG. 1 mainly include an engine 2, an air intake pipe 3, and an exhaust pipe 4.

Air (fresh air and inlet air) is supplied to the engine 2 through the air intake pipe 3. An air flow meter 31 is disposed in the air intake pipe 3. The air flow meter 31 measures the amount of inlet air. Here, the amount of inlet air is, for example, a mass flow rate per unit time.

An injector and an engine speed sensor (not shown) are mounted in the engine 2. Fuel is supplied into a cylinder by the injection from the injector. The engine speed sensor measures the engine speed (per unit time) of the engine 2.

Exhaust gas from the engine 2 is discharged into the exhaust pipe 4. A additive fuel injector 41, an oxidation catalyst 5 (diesel oxidation catalyst [DOC]), an A/F sensor 42, a NOx (nitrogen oxides) occlusion-reduction catalyst 6 (NOx catalyst, Lean NOx Trap [LNT]), and an A/F sensor 43 are sequentially disposed in the exhaust pipe 4 from the upstream side thereof. The additive fuel injector 41 adds (injects) fuel to form a rich atmosphere (mixture). The A/F sensors 42 and 43 measure a value of an air-to-fuel (A/F) ratio. Unburned HC within the fuel added from the additive fuel injector 41 burns (or is made lighter) as a result of the presence of the DOC 5.

The LNT 6 has a structure in which, for example, a carrier layer is formed on a ceramic substrate, and an occlusive agent and a catalyst are carried on the carrier. Gamma-alumina, for example, is preferably used as the carrier because a large amount of the occlusive agent and the catalyst can be carried due to the large area of the surface of a carrier provided with projections and recesses. Barium, lithium, potassium, and the like can be used as the occlusive agent. Platinum and the like can be used as the catalyst.

In the LNT 6, the NOx within the exhaust gas is occluded by the occlusive agent in a lean fuel/air mixture in which the fuel is leaner than a theoretical air-to-fuel ratio (A/F value [air-to-fuel value] is ordinarily 17 or more). When the air-to-fuel ratio is adjusted to a rich mixture in which the fuel is present in higher concentration than the theoretical air-to-fuel ratio (A/F value is ordinarily 14.5 or less), and a predetermined temperature condition (such as 300 degrees Celsius or higher to allow the catalyst to function [all temperatures hereinafter are shown in Celsius]) is satisfied, the NOx occluded by the occlusive agent is reduced by a reducing agent generated from a component within the fuel. The NOx to becomes harmless nitrogen and is discharged. In the exhaust gas purifying apparatus 1, the additive fuel injector 41 adds (injects) fuel to form the rich mixture.

Measurement values obtained from the above-described air flow meter 31, the engine speed sensor, the A/F sensors 42 and 43 are sent to an electronic control unit 7 (ECU). The ECU 7 controls timing and the amount of fuel injection by the injector to the engine 2. The ECU 7 also controls the amount and duration of fuel injection by the additive fuel injector 41. The ECU 7 has the configuration of an ordinary computer, and includes a central processing unit (CPU) which performs various computations and a memory which stores various pieces of information.

As described above, as usage frequency increases, the additive fuel injector 41 deteriorates due to the effects of clogging by soot and the like. The actual amount injected (true value) can become smaller than a commanded value of the injection amount instructed by the ECU 7. Therefore, information regarding the difference between the commanded value and the true value is required to be obtained in advance, and the commanded value is required to be corrected based on the information. According to the embodiment, in the apparatus configuration shown in FIG. 1, a calculation process for calculating a correction value of the injection amount is performed when the additive fuel injector 41 has deteriorated.

Figure 2:
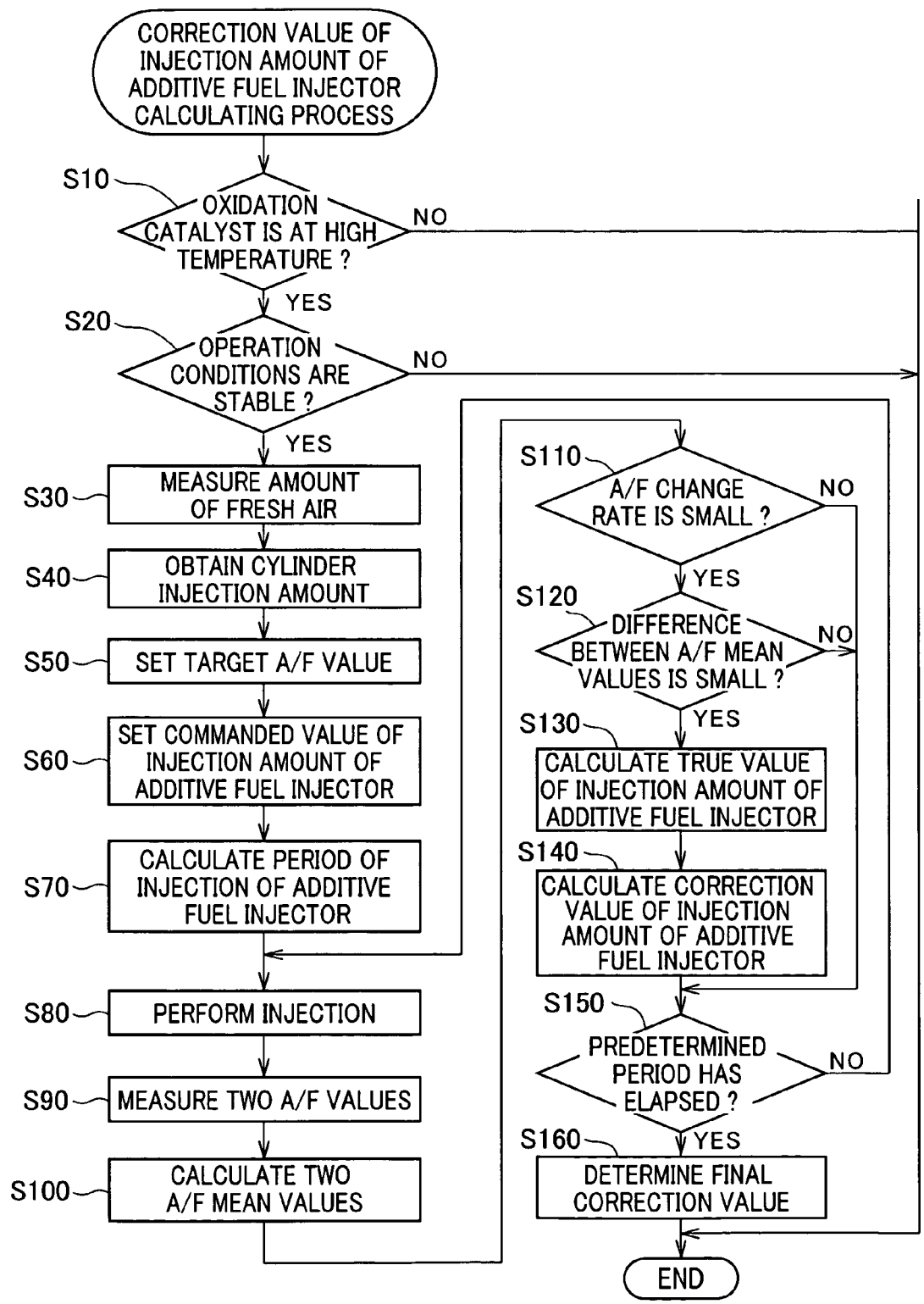
FIG. 2 is a flowchart of a procedure for calculating a correction value of the injection amount of an additive fuel injector.

More specifically, the additive fuel injector 41 injects the fuel for the purpose of calculating the correction value during a period excluding a period during which the LNT 6 performs NOx reduction or SOx (sulfur oxides) reduction. The resulting change in the A/F value is measured, and the correction value is calculated from the measured change. FIG. 2 shows operations performed in the process. The ECU 7 automatically performs the process shown in FIG. 2 in succession.

First, in step S10, the ECU 7 determines whether or not the DOC 5 is at a sufficiently high temperature. In step S10, for example, an exhaust gas temperature sensor is mounted on the upstream side or the downstream side of the DOC 5. The ECU 7 determines whether or not a measurement value measured by the exhaust gas temperature sensor is higher than a predetermined temperature. When the measurement value is equal to the predetermined temperature or higher (YES in step S10), the ECU 7 proceeds to step S20. When the measured value is less than the predetermined temperature (NO in step S10), the process in FIG. 2 is completed. The predetermined temperature is, for example, 500 degrees Celsius. When the temperature is 500 degrees Celsius or more, an oxidation reaction can be performed by the DOC 5, even when the DOC 5 is slightly deteriorated. Thereby, unburned HC can be reduced. Therefore, reliability of the measurement values obtained from the A/F sensors 42 and 43 increases.

Next, in step S20, the ECU 7 determines whether or not the engine's operation conditions are stable. Here, values of the engine speed and injection amount (or accelerator opening) are used as the operation conditions. When the amount of change in the values of the engine speed and injection amount (or accelerator opening) over a predetermined period in the past is less than a predetermined value, the ECU 7 determines that the operation conditions are stable.

The engine 2 can include the engine speed sensor to obtain the engine speed or an accelerator opening sensor to obtain information on the accelerator opening. A measurement value obtained from the engine speed sensor or the accelerator opening sensor can be used. As the value of the injection amount (the amount of injection), the commanded value of the injection amount can be obtained from the ECU 7. When the operation conditions are stable (YES in step S20), the ECU 7 proceeds to step S30. When the operation conditions are not stable (NO in step S20), the process shown in FIG. 2 is completed. When the operation conditions are not stable, the amount of fresh air in the exhaust gas from the engine 2 and the cylinder injection amount are not stabilized. As a result, the A/F value becomes unstable. Therefore, by using an operation condition detecting means, such as step S20, operation states which degrade detection accuracy of the A/F sensor can be excluded. Thereby, the correction value for the injection amount from the additive fuel injector 41 can be accurately calculated.

Next, in step S30, the amount of fresh air Ga is measured by the air flow meter 31. Then, in step S40, information on the cylinder injection amount Q is obtained. This information can be obtained as the commanded value of the injection amount for a single injection instructed from the ECU 7 to the injector of the engine 2. Next, in step S50, a target A/F value AFtarget is set. In the present embodiment, the target A/F value AFtarget is set to be leaner than the theoretical air-to-fuel ratio. Thereby, the unburned HC is reduced, and reliability of the measurement values obtained from the A/F sensors 42 and 43 is increased. In particular, the target A/F value is preferably 16 or more because the DOC 5 has a significant effect on burning of the unburned HC.

Next, in step S60, the ECU 7 sets a commanded value Qadd of the injection amount from the additive fuel injector 41. Qadd is preferably the smallest value within a range in which injection is possible even when the additive fuel injector 41 is deteriorated. Thereby, the correction value of the injection amount can be calculated even when the deterioration of the additive fuel injector 41 has progressed. Furthermore, pulsation of an A/F measurement value, described later, can be reduced as a result of Qadd being a small value. The commanded value of the injection amount can be set such that instantaneous values of the A/F values measured by the A/F sensors 42 and 43 are always lean (16 or more, in particular). In this case, the mean value which is obtained later becomes lean, and each instantaneous value also becomes lean. Thereby, the unburned HC within the exhaust gas can be reduced. The injection amount during NOx reduction or SOx reduction (described above) can be used as the commanded value of the injection amount.

Next, in step S70, the ECU 7 calculates an injection period Tadd of the injection from the additive fuel injector 41. Specifically, Tadd is calculated by the following equation (E1).

$$Tadd = AFtarget \cdot Qadd / (Ga - Q/AFtarget) \quad (E1)$$

The equation (E1) is described hereinafter. The injection amount from the additive fuel injector 41 to the exhaust pipe 4 is Qadd per single injection. The period of the injection from the additive fuel injector 41 is Tadd. Therefore, the injection amount from the additive fuel injector 41 per unit time is Qadd/Tadd. The cylinder injection amount from the injector per unit time is Q, which is obtained in step S40. Therefore, the total injection amount per unit time of the injection from the injector into the cylinder and the injection from the additive fuel injector 41 into the exhaust pipe 4 is Q+Qadd/Tadd.

The amount of fresh air per unit time is Ga, which is determined in step S30. Therefore, when the target A/F value AFtarget is achieved by the above-described amount of fresh air and injection amount, the following equation (E2) is satisfied. When the equation (E2) is solved regarding Tadd, the equation (E1) is obtained.

$$AFtarget = Ga/(Q + Qadd/Tadd) \quad (E2)$$

Next, the ECU 7 repeatedly performs the process in steps S80 to S140, within a predetermined period. The predetermined period is a period over which the process for obtaining the correction value of the injection amount from the additive fuel injector 41 is performed, and is determined in advance. In the process shown in FIG. 2, the cycle period in which the process in steps S80 to S140 is repeatedly performed is Tadd, which is obtained in step S70. The value of the predetermined period is, set to hereinafter, n-times Tadd (n=1, 2, . . . ). Therefore, the process in steps S80 to S140 is repeated n times. The k-th process will be described below (k=1, 2, . . . , k≦n).

First, in step S80, the additive fuel injector 41 injects fuel once. The injection amount is set to Qadd, which is obtained in step S60. As a result, an injection whose injection amount is Qadd is performed in a period of Tadd. Next, in step S90, two A/F values are measured. The two A/F values refer to the A/F values (A/F measurement values) measured by the A/F sensor 42 disposed on the upstream side and the A/F sensor 43 disposed on the downstream side. Among the A/F measurement values measured in step S40, the measurement value measured by the A/F sensor 42 on the upstream side is set to AF1(k) and the measurement value measured by the A/F sensor 43 on the downstream side is set to AF2(k). Here, (k) indicates that the process is the k-th process.

In step S100, two A/F mean values are calculated. The A/F mean values refer to AF1mean and AF2mean calculated by the following equations (E3) and (E4) from the A/F measurement values obtained in step S90.

$$AF1mean(k) = \{AF1(1) + AF1(2) + \ldots + AF1(k)\}/k \quad (E3)$$

$$AF2mean(k) = \{AF2(1) + AF2(2) + \ldots + AF2(k)\}/k \quad (E4)$$

Next, in step S110, the ECU 7 determines whether or not absolute values of rates of change in the A/F mean values obtained in step S100 are small. Specifically, the ECU 7 determines whether or not both of the following inequalities (E5) and (E6) are satisfied.

$$|\{AF1mean(k) - AF1mean(k-1)\}/Tadd| < \Delta 1 \quad (E5)$$

$$|\{AF2mean(k) - AF2mean(k-1)\}/Tadd| < \Delta 2 \quad (E6)$$

When both (E5) and (E6) are satisfied (YES in step S110), the ECU 7 proceeds to step S120. When at least one of (E5) and (E6) is not satisfied (NO in step S110), the ECU 7 proceeds to step S150. The values of AF1mean (0) and AF2mean (0) are set to zero. The values of $\Delta 1$ and $\Delta 2$ are determined in advance. The values of $\Delta 1$ and $\Delta 2$ may be the same. As a result of the determination process shown in step S110, cases in which the degree of change in the A/F measurement values is large and reliability of the measurement values is low are eliminated.

Next, in step S120, the ECU 7 determines whether or not the values of the two A/F mean values obtained in step S100 are sufficiently small. Specifically, the ECU 7 determines whether or not the following inequality (E7) is satisfied. When (E7) is satisfied (YES in step S120), the ECU 7 proceeds to step S130. When (E7) is not satisfied (NO in step S120), the ECU 7 proceeds to step S150. The value of $\Delta 3$ is determined in advance. As a result of the determination process shown in step S120, situations in which the difference between the two A/F measurement values is great is eliminated.

$$|AF1mean(k) - AF2mean(k)| < \Delta 3 \quad (E7)$$

Next, in step S130, a true value of the injection amount of the additive fuel injector is calculated. Specifically, Qaddtrue (k) is calculated using the following equation (E8). The obtained value is set to the true value of the injection amount of the additive fuel injector. Ga is the amount of fresh air obtained in step S30. AF1mean(k) is the mean value of the A/F values obtained in step S100. Q is the cylinder injection amount obtained in step S40. Tadd is the period in which the additive fuel injector 41 performs injection, which is calculated in step S70.

$$Q\text{addtrue}(k) = (Ga/AF1\text{mean}(k) - Q) \cdot T\text{add} \quad (E8)$$

The equation (E8) is described below. In the above-described equation (E2), the injection amount from the additive fuel injector 41 is set to the commanded value Qadd, and the A/F value is set to the target A/F value AFtarget. Based on the above description, when the true value of the injection amount from the additive fuel injector 41 is set to Qaddtrue (k), the above-described A/F mean value AF1mean(k) is achieved by Qaddtrue(k).

Therefore, when the injection amount from the additive fuel injector 41 is set to the true value Qaddtrue(k) and the A/F value is set to the A/F mean value AF1mean(k), the following equation (E9) is established based on the similar logic as that behind the derivation of equation (E2). When equation (E9) is solved regarding Qaddtrue(k), equation (E8) is obtained. AF1mean(k) in equations (E8) and (E9) can naturally be replaced with AF2mean(k).

$$AF1\text{mean}(k) = Ga/(Q + Q\text{addtrue}(k)/T\text{add}) \quad (E9)$$

Next, in step S140, the ECU 7 calculates the correction value of the injection amount of the additive fuel injector. Specifically, ΔQadd obtained through calculation of the following equation (E10) is set to the injection amount correction value. Qadd is the commanded value of the injection amount from the additive fuel injector 41 obtained in step S60. Qaddtrue(k) is the true value of the injection amount from the additive fuel injector 41 obtained in step S130. That is, through equation (E10), the difference between these values is set to the correction value of the injection amount from the additive fuel injector 41.

$$\Delta Q\text{add}(k) = Q\text{add} - Q\text{addtrue}(k) \quad (E10)$$

Next, in step S150, the ECU 7 determines whether or not the predetermined period has elapsed. In step S150, the ECU 7 determines whether or not the elapsed time from the time when the first process of step S80 is started exceeds the predetermined period. When the predetermined period is exceeded (Yes in step S150), the ECU 7 proceeds to step S160. When the predetermined period is not exceeded (NO in step S150), the ECU 7 returns to step S80. As a result of the process described above, ΔQadd(k) (k=1, 2, ..., n) is calculated.

Next, in step S160, the ECU 7 determines a final correction value of the injection amount from the additive fuel injector 41. The final correction value is a correction value which is finally determined after the correction values ΔQadd(k) (k=1, 2, ... n) are calculated by repeating the process shown in steps S80 to S140, as described above. Specifically, a final correction value ΔQaddfinal is determined by the following equation (E11). That is, the last calculated correction value ΔQadd (n) is the final correction value ΔQaddfinal. Since the ΔQadd (n) is the final correction value, an effect is achieved in that a correction value obtained when the measurement values are the most stable and reliable can be used as the final correction value.

$$\Delta Q\text{addfinal} = \Delta Q\text{add}(n) \quad (E11)$$

The final correction value ΔQaddfinal is used as the correction value of the injection amount from the additive fuel injector 41 for the NOx reduction and SOx reduction in the LNT 6. That is, after the ECU 7 calculates the commanded value of the injection amount from the additive fuel injector 41, a value obtained by adding ΔQaddfinal to the commanded value is set to a corrected commanded value. The ECU 7 sends the corrected commanded value to the additive fuel injector 41.

In the above description, the A/F value is measured once for a single injection. However, the present invention is not limited thereto. The A/F value may be measured any number of times for a single injection. The process in steps S100 to S140 may be performed each time when the A/F value is measured. In this case, the denominators in equations (E5) and (E6) are changed based on the period in which the A/F value is measured.

Figure 3:
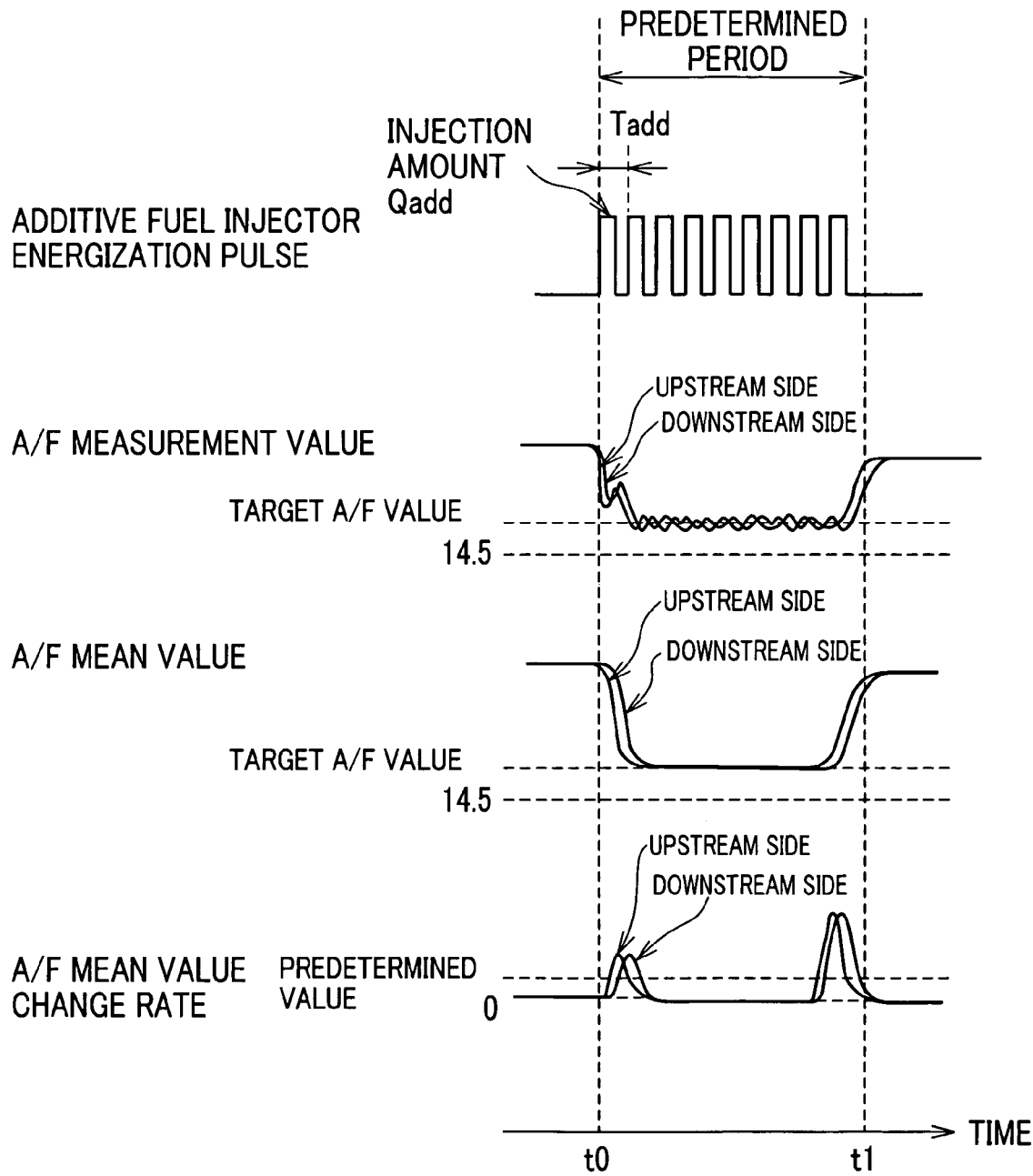
FIG. 3 is a diagram of a transition over time of an additive fuel injector energization pulses, A/F measurement values, A/F mean values, and A/F mean value change rates in the present embodiment.

Next, a transition over time of various values as a result of the process described above will be described with reference to FIG. 3. FIG. 3 shows a time response of additive fuel injector energization pulses, the A/F measurement values, the A/F mean values, and the A/F mean value change rates while the process in steps S80 to S140 is repeated. In FIG. 3, time t0 to t1 indicates the above-described predetermined period. The process in steps S80 to S140 is repeated nine times during the predetermined period. That is, n=9.

The additive fuel injector energization pulse refers to a pulse applied for energization when the additive fuel injector 41 injects the fuel. Each pulse corresponds to a single injection. The injection amount of each pulse is Qadd. The injection is repeated nine times (n=9) at the period Tadd over time t0 to t1.

The A/F measurement values refer to the A/F values measured in step S90. The upstream side corresponds to AF1(k), and the downstream side corresponds to AF2(k). Before time t0 and after time t1, the fuel/air mixture is a lean mixture which is the normal mixture of the engine 2. Between time t0 and t1, both the A/F measurement values of the upstream side and the downstream side are near the target A/F value. As described above, in the present embodiment, the target A/F value is set to a value on the lean side. Therefore, the A/F measurement value also shifts to the lean side during time t0 to t1. Moreover, in FIG. 3, instantaneous values of both A/F measurement values of the upstream side and the downstream side are on the lean side.

The A/F mean values refer to the mean values of the A/F measurement values obtained in step S100. The upstream side corresponds to AF1mean(k), and the downstream side corresponds to AF2mean(k). Between time t0 and t1, the A/F measurement values are near the target A/F value. Therefore, the A/F mean values are also near the target A/F value and, thus, are on the lean side. The A/F measurement values oscillate due to an effect of a waveform of the additive fuel injector energization pulse. However, through smoothing by mean value calculation, the pulsation is suppressed in the A/F mean values. Therefore, the effects of pulsation are suppressed in steps S110 to S140, and the process can be accurately performed.

The A/F mean value change rate refers to the values used in step S110. The upstream side corresponds to |{AF1mean(k)−AF1mean(k−1)}/Tadd|, and the downstream side corresponds to |{AF2mean(k)−AF2mean(k−1)}/Tadd|. As described above, as a result of the determination process shown in step S110, the correction value ΔQadd(k) is not calculated at time k when the A/F mean value change rate is greater than the predetermined values (Δ1 and Δ2). Therefore, as shown in FIG. 3, the correction value ΔQadd(k) is not calculated near the start and end of the predetermined period, when the measured A/F ratio is considered to be unstable. Thereby, the correction value ΔQadd(k) can be accurately calculated.

The process cannot be accurately performed when the A/F measurement values themselves are used instead of the A/F mean values to calculate the change rate, because the effect of errors becomes large. However, since the A/F mean values are used in the process in step S110, such problems can be avoided.

In the process shown in FIG. 2, instead of obtaining the A/F mean values, the A/F measurement values may be entered into a low-pass (high-cut) filter. An output from the low-pass filter can be used in place of the A/F mean value. When smoothing processes, such as mean value calculation and high-cut processing, are performed, processes shown in FIG. 2, such as the calculation of change rates, can be accurately performed without being affected by errors.

Figure 4:
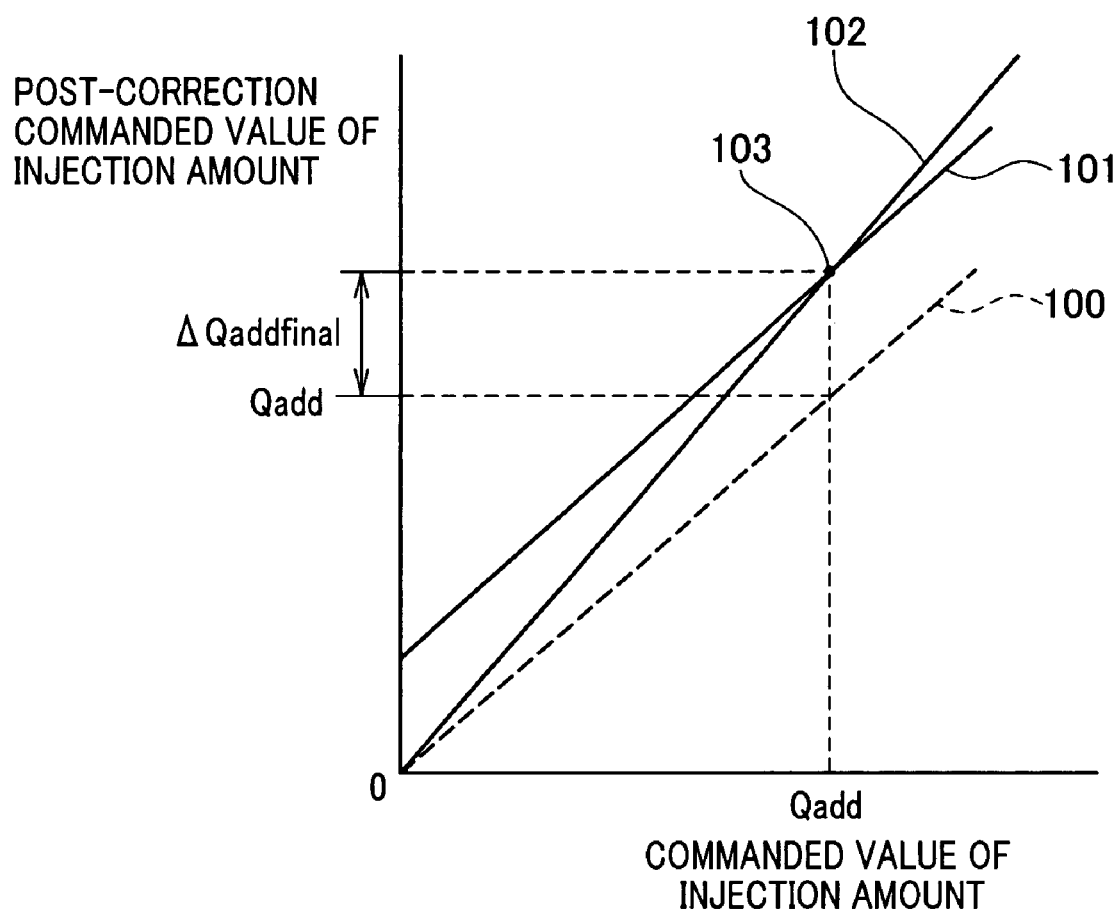
FIG. 4 is a diagram regarding a correction method.

In the above description, a correction method is described above in which the correction value is uniformly added to the commanded value of the injection amount from the additive fuel injector 41. However, the present invention is not limited thereto. Another method will be described with reference to FIG. 4. FIG. 4 is a diagram of a correction method in which a (pre-correction) commanded value of the injection amount from the additive fuel injector 41 is taken as the horizontal axis and a post-correction commanded value of the injection amount from the additive fuel injector 41 is taken as the vertical axis.

Broken line 100 is a straight line having a gradient of 1 passing through the point of origin. Solid line 101 is a straight line indicating the above-described correction method. As a result of the process shown in FIG. 2, ΔQaddfinal is calculated as the correction value when the commanded value of the injection amount is Qadd. In the solid line 101, the post-correction commanded value is a value obtained by adding ΔQaddfinal to a (pre-correction) commanded value of the arbitrary injection amount.

On the other hand, the solid line 102 indicates another correction method. At a point 103, the (pre-correction) commanded value of the injection amount is Qadd and the post-correction commanded value is Qadd+ΔQaddfinal. As shown in FIG. 4, the solid line 102 is a straight line connecting the point of origin and the point 103. In the solid line 102, a proportional relationship is established between the (pre-correction) commanded value and the correction value. The correction method indicated by the solid line 102 is preferred when the decrease in the injection amount (true value) caused by deterioration of the additive fuel injector 41 tends to vary depending on the increase and decrease in the commanded value.

Figure 5:
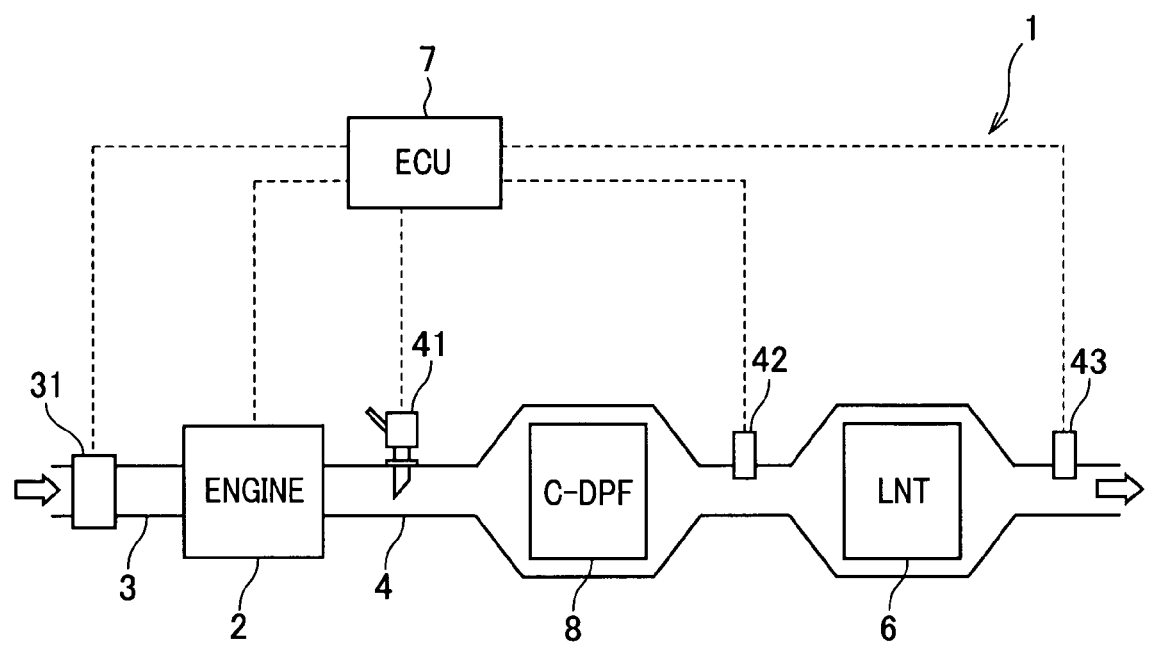
FIG. 5 is a schematic diagram according to another embodiment of the present invention.

FIG. 1 shows a configuration in which DOC 5 is used. However, the present invention is not limited to this configuration. Another configuration is shown in FIG. 5. In FIG. 5, a diesel particulate filter 8 including an oxidation catalyst (catalyzed diesel particulate filter [C-DPF]) is provided instead of the DOC 5.

The C-DPF 8 may be a filter having a so-called honeycomb structure, which is configured such that an inlet side and an outlet side are alternately clogged. The C-DPF 8 collects particulate matters discharged from the engine 2. The collected particulate matters are burned by being heated at timed intervals, and the C-DPF 8 is regenerated. The C-DPF 8 carries a catalyst such as platinum. When so the C-DPF 8 is heated and regenerated, the additive fuel injector 41 injects fuel. Unburned HC components within the fuel burn by the influence of the catalyst within the C-DPF 8, and the C-DPF 8 is heated.

When the configuration shown in FIG. 5 is used, the catalyst carried by the C-DPF 8 can provide the same function as that of the DOC 5 shown in FIG. 1. Moreover, the correction value calculation process shown in the flowchart in FIG. 2 may be performed during the regeneration of the C-DPF 8. This is efficient in that the injection from the additive fuel injector performed in step S80 can be used not only for calculation of the correction value of the injection amount but also for DPF regeneration.

In the above-described embodiments, the A/F sensor 42 configures a first air-to-fuel ratio sensor. The A/F sensor 43 configures a second air-to-fuel ratio sensor. The process shown in step S50 configures a setting means. The process shown in step S80 configures an adding controlling means. The process shown in step S120 configures a determining means. The processes shown in steps S140 and S160 configure a calculating means. The process shown in step S10 configures a temperature calculating means. The process shown in step S110 configures a change rate determining means. The DOC 5 and the C-DPF 8 configure a catalyst providing an oxidation function. The C-DPF 8 configures a filter.

SUMMARY

As described above, the exhaust gas purifying apparatus for an internal combustion engine of the present embodiment includes an additive fuel injector that adds fuel into an exhaust passage, a catalyst providing an oxidation function, a first A/F sensor that measures an A/F value, a NOx catalyst that occludes and reduces NOx, and a second A/F sensor that measures an A/F value, which are arranged in the exhaust passage in sequence from an upstream side of the exhaust passage. The apparatus includes a setting unit that sets commanded values of an amount and a period of injection from the additive fuel injector such that an A/F value within the exhaust passage is a target A/F value that is leaner than a theoretical air-to-fuel ratio, an adding controlling unit that injects fuel from the additive fuel injector for a predetermined period in accordance with the commanded values set by the setting unit, a determining unit that determines whether or not a high-accuracy measurement state has been entered in which a difference between a measurement value of the first A/F sensor and a measurement value of the second A/F sensor is within a predetermined range, during a period in which the A/F value within the exhaust passage is affected by the injection of fuel by the adding controlling unit, and a calculating unit that calculates, when the determining unit determines that the high-accuracy measurement state has been entered, a deviation between the commanded value and a true value of the amount of injection in the injection by the adding controlling unit as a correction value of the amount of injection, from at least one of the measurement value of the first A/F sensor and the measurement value of the second A/F sensor.

As a result, in the exhaust gas purifying apparatus for an internal combustion engine of the present embodiment, the target A/F value is lean in the injection performed when the correction value of the amount of injection from the additive fuel injector is calculated. Therefore, the amount of unburned HC components within the exhaust gas is small. Reliability of the measurement values of the A/F sensors can be increased. The injection of fuel from the additive fuel injector is intermittently performed based on the amount of injection and the injection period set by the setting unit. Therefore, in the case of a single fuel injection, decline in reliability of the measurement values of the A/F sensors caused by deposition of fuel onto a wall surface and slow response of the A/F sensors can be avoided.

Moreover, in the present embodiment, the correction value is calculated only in the high-accuracy measurement state in which the difference between the measurement values of the first A/F sensor and the second A/F sensor is within a predetermined range. When only one of the first A/F sensor and the second A/F sensor is used as in the conventional technique, the effect of the unburned HC on the measurement value cannot be determined. However, when two A/F sensors are used, determination can be made that, when the measurement value of the first A/F sensor and the measurement value of the second A/F sensor differ from each other, the amount of unburned HC is still large at the position of the first A/F sensor and burning of the unburned HC has progressed at the position of the second A/F sensor due to the NOx catalyst. In this case, whether or not the unburned HC has sufficiently burned cannot be determined even at the position of the second A/F sensor. Therefore, neither of the measurement values of the two A/F sensors is reliable.

However, when the measurement values of the two A/F sensors are almost the same, determination can be made that the measurement values of the two A/F sensors are almost the same because the unburned HC has been sufficiently burned by the catalyst provided upstream from the first A/F sensor and is not required to be further burned by the NOx catalyst. Therefore, in this case, both measurement values of the two A/F sensors are reliable. In this way, in the present embodiment, whether or not the measurement values of the A/F sensors are reliable can be determined by use of the two A/F sensors. The correction value of the amount of injection from the additive fuel injector is calculated using only reliable measurement values. In the present embodiment, as a result of a combination of the target A/F value being lean and two A/F sensors being used, adverse effect of the unburned HC on the A/F sensor can be almost completely eliminated.

In addition, a filter is provided downstream from the additive fuel injector in the exhaust passage and collects particulate matter. The injection of fuel by the adding controlling unit is preferably performed during a period over which the filter removes the particulate matter.

As a result, the injection of fuel by the adding controlling unit is performed while the filter removes the particulate matter. Therefore, efficiency is achieved because the injection of fuel by the adding controlling unit can be used not only to calculate the correction value of the amount of injection from the additive fuel injector but also to regenerate the filter.

The commanded value of the amount of injection set by the setting unit is preferably an amount of injection for reducing NOx or SOx by the NOx catalyst.

As a result, in the present embodiment, the amount of injection is fixed. When the amount of injection is not fixed, the calculation of the correction value of the amount of injection becomes inaccurate due to variations caused by differences in the amount of injection from the additive fuel injector. On the other hand, in the present embodiment, the amount of a single injection is constant. Therefore, the correction value of the amount of injection can be accurately calculated. Moreover, the amount of a single injection is the same as the amount of injection actually used when NOx reduction or SOx reduction is performed. Therefore, the amount of injection is not required to be changed for the present embodiment. Moreover, this is preferable because the difference between the actual amounts of injection can be calculated.

The target A/F value is preferably 16 or more. As a result, sufficient oxygen concentration can be ensured, and the amount of unburned HC can be sufficiently reduced. Therefore, the measurement accuracy of the A/F sensor can be increased.

The commanded value of the amount of injection set by the setting unit is an amount of injection in which an instantaneous value of the A/F value within the exhaust passage is leaner than a theoretical air-to-fuel ratio.

As a result, the target A/F value is made lean, and the amount of injection is adjusted so that the instantaneous value of the A/F value becomes lean. Therefore, when sufficient time has elapsed, the A/F value becomes lean, and each instantaneous value during the time can also become lean. When the instantaneous value of the A/F value becomes rich, an oxygen deficiency occurs, and the amount of unburned HC increases. Thereby, reliability of the measurement values of the A/F sensors decreases. However, this problem can be avoided in the present embodiment.

The commanded value of the amount of injection set by the setting unit is preferably an amount of injection in which an instantaneous value of the A/F value within the exhaust passage is 16 or more.

As a result, the target amount of injection is made lean, and the amount of injection is adjusted so that the instantaneous value of the A/F value becomes 16 or more. When the instantaneous value of the A/F value is less than 16, an oxygen deficiency occurs. A tendency for the unburned HC to increase becomes noticeable, and reliability of the measurement values of the A/F sensors significantly decreases. However, this problem can be avoided in the present embodiment.

In addition, a temperature calculating unit that calculates a temperature of the catalyst is included. The injection of fuel by the adding controlling unit is preferably performed when the temperature of the catalyst calculated by the temperature calculating unit is higher than a predetermined temperature.

As a result, the correction value of the amount of injection from the additive fuel injector is calculated only when the catalyst which provides an oxidation function is at a sufficiently high temperature. Therefore, the possibility of the A/F sensors being adversely affected because the amount of unburned HC in the exhaust gas is large due to the catalyst being at a low temperature can be reduced. As described above, as a result of a combination of the target A/F value being lean, two A/F sensors being used, and the catalyst which provides an oxidation function at a high temperature, a noteworthy effect can be achieved in which adverse effect of the unburned HC on the calculation of the correction value of the amount of injection from the additive fuel injector is almost completely eliminated.

In addition, a change rate determining unit that determines whether or not a change rate of the measurement values of at least one of the first A/F sensor and the second A/F sensor is smaller than a predetermined value is included. The calculating unit preferably calculates the correction value when the change rate determining unit determines that the change rage of the measurement values is smaller than the predetermined value.

As a result, cases in which the change rate of the measurement values is high and unstable and reliability of the measurement values is low can be excluded when the correction value is calculated. Therefore, the correction value of the amount of injection from the additive fuel injector can be calculated using reliable measurement values only.

It will be appreciated that the present invention is not limited to the configurations described above, but any and all modifications, variations or equivalents, which may occur to those who are skilled in the art, should be considered to fall within the scope of the present invention.

What is claimed is:

1. An exhaust gas purifying apparatus for an internal combustion engine comprising:
 an additive fuel injector that adds fuel into an exhaust passage, a catalyst providing an oxidation function, a first air-to-fuel ratio sensor that measures an air-to-fuel ratio, a NOx catalyst that occludes and reduces NOx, and a second air-to-fuel ratio sensor that measures an air-to-fuel ratio, the additive fuel injector, the catalyst, the first air-to-fuel ratio sensor, the NOx catalyst, and the second air-to-fuel ratio sensor being arranged in the exhaust passage in sequence from an upstream side of the exhaust passage;

a setting unit that sets commanded values of an amount and a period of injection from the additive fuel injector such that an air-to-fuel ratio within the exhaust passage is a target air-to-fuel ratio that is leaner than a theoretical air-to-fuel ratio;

an adding controlling unit that injects fuel from the additive fuel injector for a predetermined period in accordance with the commanded values set by the setting unit;

a determining unit that determines whether or not a high-accuracy measurement state has been entered in which a difference between a measurement value of the first air-to-fuel ratio sensor and a measurement value of the second air-to-fuel ratio sensor is within a predetermined range, during a period in which the air-to-fuel ratio within the exhaust passage is affected by the injection of fuel by the adding controlling unit;

a calculating unit that calculates, when the determining unit determines that the high-accuracy measurement state has been entered, a deviation between the commanded value and a true value of the amount of injection in the injection by the adding controlling unit as a correction value of the amount of injection, from at least one of the measurement value of the first air-to-fuel ratio sensor and the measurement value of the second air-to-fuel ratio sensor; and a correcting unit that adds the correction value to the commanded value of the amount of injection.

2. The apparatus according to claim 1, further comprising a filter that is provided downstream from the additive fuel injector in the exhaust passage and collects particulate matter, wherein the injection of fuel by the adding controlling unit is performed during a period over which the filter removes the particulate matter.

3. The apparatus according to claim 1, wherein the commanded value of the amount of injection set by the setting unit is an amount of injection for reducing NOx or SOx by the NOx catalyst.

4. The apparatus according to claim 1, wherein the target air-to-fuel ratio is 16 or more.

5. The apparatus according to claim 1, wherein the commanded value of the amount of injection set by the setting unit is an amount of injection in which an instantaneous value of the air-to-fuel ratio within the exhaust passage is leaner than a theoretical air-to-fuel ratio.

6. The apparatus according to claim 1, wherein the commanded value of the amount of injection set by the setting unit is an amount of injection in which an instantaneous value of the air-to-fuel ratio within the exhaust passage is 16 or more.

7. The apparatus according to claim 1, further comprising a temperature calculating unit that calculates a temperature of the catalyst, wherein the injection of fuel by the adding controlling unit is performed when the temperature of the catalyst calculated by the temperature calculating unit is higher than a predetermined temperature.

8. The apparatus according to claim 1, further comprising a change rate determining unit that determines whether or not a change rate of the measurement values of at least one of the first air-to-fuel ratio sensor and the second air-to-fuel ratio sensor is smaller than a predetermined value, wherein the calculating unit calculates the correction value when the change rate determining unit determines that the change rate of the measurement values is smaller than the predetermined value.

9. The apparatus according to claim 1, wherein the measurement value of the first air-to-fuel ratio sensor and the measurement value of the second air-to-fuel ratio sensor are calculated mean values.

10. An exhaust gas purifying apparatus for an internal combustion engine comprising:

an additive fuel injector that adds fuel into an exhaust passage, a catalyst providing an oxidation function, a first air-to-fuel ratio sensor that measures an air-to-fuel ratio, a NOx catalyst that occludes and reduces NOx, and a second air-to-fuel ratio sensor that measures an air-to-fuel ratio, the additive fuel injector, the catalyst, the first air-to-fuel ratio sensor, the NOx catalyst, and the second air-to-fuel ratio sensor being arranged in the exhaust passage in sequence from an upstream side of the exhaust passage;

a setting means for setting commanded values of an amount and a period of injection from the additive fuel injector such that an air-to-fuel ratio within the exhaust passage is a target air-to-fuel ratio that is leaner than a theoretical air-to-fuel ratio;

an adding controlling means for injecting fuel from the additive fuel injector for a predetermined period in accordance with the commanded values set by the setting means;

a determining means for determining whether or not a high-accuracy measurement state has been entered in which a difference between a measurement value of the first air-to-fuel ratio sensor and a measurement value of the second air-to-fuel ratio sensor is within a predetermined range, during a period in which the air-to-fuel ratio within the exhaust passage is affected by the injection of fuel by the adding controlling means;

a calculating means for calculating, when the determining means determines that the high-accuracy measurement state has been entered, a deviation between the commanded value and a true value of the amount of injection in the injection by the adding controlling means as a correction value of the amount of injection, from at least one of the measurement value of the first air-to-fuel ratio sensor and the measurement value of the second air-to-fuel ratio sensor; and a correcting means for adding the correction value to the commanded value of the amount of injection.

* * * * *